United States Patent [19]
Steiner et al.

[11] Patent Number: 5,748,828
[45] Date of Patent: May 5, 1998

[54] COLOR SEPARATING BACKLIGHT

[75] Inventors: Ivan B. Steiner, Ridgewood; Scott M. Zimmerman, Basking Ridge; Karl W. Beeson, Princeton, all of N.J.

[73] Assignee: AlliedSignal Inc., Morris Township, N.J.

[21] Appl. No.: 782,133

[22] Filed: Jan. 13, 1997

Related U.S. Application Data

[60] Provisional application No. 60/009,922, Jan. 16, 1996.

Related U.S. Application Data

[63] Continuation-in-part of Ser. No. 376,709, Jan. 23, 1995, Pat. No. 5,555,329, which is a continuation-in-part of Ser. No. 149,912, Nov. 10, 1993, Pat. No. 5,396,350, Ser. No. 242,525, May 13, 1994, Pat. No. 5,428,468, and Ser. No. 321,368, Oct. 11, 1994.

[51] Int. Cl.$^6$ .................................................. G02B 6/10
[52] U.S. Cl. ................... 385/146; 349/62; 349/65; 359/291; 362/32
[58] Field of Search .......................... 385/31, 36, 146, 385/147, 901; 359/34, 291, 454, 292; 349/62–65; 362/32

[56] References Cited

U.S. PATENT DOCUMENTS

| | | | |
|---|---|---|---|
| 4,544,239 | 10/1985 | Shone et al. | 252/583 |
| 4,625,390 | 12/1986 | Shone et al. | 359/324 |
| 4,836,649 | 6/1989 | Ledebuhr et al. | 350/331 R |
| 4,909,601 | 3/1990 | Yajima et al. | 350/331 R |
| 4,989,076 | 1/1991 | Owada et al. | 358/61 |
| 5,196,926 | 3/1993 | Lee | 358/60 |
| 5,200,843 | 4/1993 | Karasawa et al. | 359/40 |
| 5,315,418 | 5/1994 | Sprague et al. | 359/41 |
| 5,319,491 | 6/1994 | Selbrede | 359/291 |
| 5,321,448 | 6/1994 | Ogawa | 353/34 |
| 5,357,288 | 10/1994 | Hiroshima et al. | 348/742 |
| 5,389,982 | 2/1995 | Lee | 353/37 |
| 5,428,468 | 6/1995 | Zimmerman et al. | 359/40 |

FOREIGN PATENT DOCUMENTS

| | | |
|---|---|---|
| 2 260 203 | 4/1993 | Germany. |
| 3-696694 | of 1991 | Japan. |
| 5-181107 | of 1993 | Japan. |
| 5-289047 | of 1993 | Japan. |
| 05 323307 | 12/1993 | Japan. |
| 6-208099 | of 1994 | Japan. |
| 6-250177 | of 1994 | Japan. |
| 6-34928 | of 1994 | Japan. |
| 07 092327 | 4/1995 | Japan. |
| 2 260 203 A | 2/1992 | United Kingdom. |

OTHER PUBLICATIONS

B.A. Loiseaux, et al., Compact Spatio–Chromatic Single–LCD Projection Architecture (no date).
N. Ichikawa, Holographic Optical Element for Liquid Crystal Projector (no date).
B.G. Rho, et al., A New LCD Projector System with Higher Brightness (no date).

*Primary Examiner*—Akm E. Ullah
*Attorney, Agent, or Firm*—Verne E. Kreger, Jr.

[57] ABSTRACT

A backlight for use in a flat panel display backlight consists of three components, (1) a collimating means, optically coupled to a waveguide suitable for transmitting light, which collimates white light and directs the light at an angle to the normal (perpendicular) direction to the surface of the flat panel display, (2) diffraction means that extend across the entire display between the collimating means and the flat panel, which angularly separates the white light into red, green and blue components, and (3) light directing means, also extending across the entire display between the diffraction means and the flat panel display, for focusing the red, green and blue light components onto the individual red, green and blue color subpixels of the LCD in an aligned fashion.

11 Claims, 3 Drawing Sheets

COLOR SEPARATING BACKLIGHT

CROSS REFERENCE TO RELATED APPLICATIONS

This application claims the benefit of U.S. Provisional Application No. 60/009,922 filed Jan. 16, 1996 which is a continuation-in-part of U.S. patent application Ser. Nos. 08/376,709 filed Jan. 23, 1995, now U.S. Pat. No. 5,555,329, which is a continuation-in-part of three U.S. patent application Ser. Nos.: 08/149,912, filed Nov. 5, 1993, now U.S. Pat. No. 5,396,350; Ser. No. 08/242,525, filed May 13, 1994, now U.S. Pat. No. 5,428,468; and Ser. No. 08/321,368, filed Oct. 11, 1994, each of which is hereby incorporated by reference.

FIELD OF THE INVENTION

This invention relates to backlights for flat panel displays (FPD), especially liquid crystal displays (LCD). More particularly, a novel construction of elements has been discovered which allows for color flat panel displays and color flat panel LCD's to be realized without the power inefficiency of color formation by color filtering of white light. By maintaining the flat panel format, the invention overcomes the drawbacks of large display thickness which is present in display formats such as projection displays and projection LCD's.

BACKGROUND OF THE INVENTION

It is highly desirable to provide for color presentation of information on a display device. Such information may take the form of text, graphic, icon, video or other useful types of information. Because of the large number of colors which are discernible by the human eye it is possible to present a greater amount of information, in a more readable format, on a color display than on a black and white or a monochrome display. The amount of information which can be displayed to be read on such a device is also a function of the size of the display (usually expressed as the length of a diagonal measure across the viewing surface) and the resolution of the display, or the number of subpixels (individual red, green or blue picture elements) which are available to be modulated in presenting the information. Thus, a large diagonal, high resolution display will be capable of presenting more, or more readable information than a smaller or lower resolution display. A drawback to some types of displays is that they require a depth which is comparable to the display viewing surface dimension. Exemplary are cathode ray tube (CRT) or television (TV) displays and projection displays. In these displays, the need for depth results in an increasingly large volume for the display as the viewing surface dimension is increased. The display is therefore more bulky and the utility is decreased for such a display in environments where space is limited or where a bulky display would interfere with the aesthetic design for that environment.

Flat panel displays (FPD) overcome this drawback by providing a viewing surface whose dimension is largely independent of the display thickness, or depth, hence the name "flat panel". It is quite common in the art for a flat panel display to have a depth which is less than one tenth the length of the display surface diagonal. Such displays have found great utility in applications which favor or require a thin format, such as laptop computers, desktop computers for small offices, aircraft avionics, portable TV's, and wall hanging TV's, among others. One of the most useful types of FPD's is the liquid crystal display (LCD) which has found wide utility in most FPD applications. LCD's are widely useful due to their flat format combined with low power consumption and high resolution. The diagonal size of the viewing surface of such LCD's has also increased in recent years. Color LCD's are superior to monochrome or black and white LCD's in their ability to provide high quality, highly readable information displays in full color. This is particularly valuable in displaying video information including color TV broadcasts.

A drawback to color LCD's is the extra power required to achieve color in the display. In general, such a display requires backlighting with a white light source which is then filtered into red, blue and green colors by absorptive color filters located at the individual subpixel elements of the display. Such color filters are very inefficient. For example, the red color filter for a red subpixel only transmits approximately 60% of the red light and absorbs all the green and blue light which falls on the filter. The overall efficiency of the filter is therefore only about 20-25% for white light which falls on it. The efficiencies of the blue and green filters are similarly low. This fact requires the backlight to consume a large amount of electrical power in order to provide enough white light so that the color display will be readable after the light passes through the filters. Often the electrical power required to run the backlight for the display is a large fraction of the total power requirement of the display. This situation is particularly troublesome in portable battery-powered display applications because it drastically reduces the battery life of the display.

Several methods have been used to overcome the power inefficiencies of color LCD's. It is possible to operate a color LCD in a reflective mode, where the light is provided by an ambient light source, such as roomlight or the sun, rather than in a backlit mode. In this case the power needed for the light source is provided externally. However, a strong external light source is not always convenient and such reflective LCD displays tend to find use only in applications where power efficiency is the overriding criteria, and in fact are often used in a monochrome format for this same reason.

It has also been proposed that the white continuum light source (such as an arc lamp) of a projection LCD system could be spatially separated into a spectrum (or rainbow) of colors by an appropriate optical element or set of elements and directed to fall in an aligned format onto the black matrix of the LCD pixel. In this manner the red, green and blue components of the light would be aligned with the respective subpixels and the intervening colors of the spectrum would fall onto the black matrix and be absorbed. This method would eliminate the inefficiency of the color filters, although some power would still be lost through absorption of the other colors present in the continuum light source. Huignard (FR 2707447) has proposed that this color separation can be achieved in a projector display with a combination of a color separator, a spatial filter and a lens. Loiseaux has proposed that this color separation can be achieved in a projection display with a combination of a wide bandpass phase grating and a lens array. (Loiseaux, Joubert, Delboulbe', Huignard and Battarel, *Asia Display* '95, Proceedings of the 15th International Display Research Conference, Oct. 16-18, 1995, pages 87-89). Ichikawa has proposed that this color separation can be achieved in a projection display with a single holographic optical element which combines the optical properties of the phase grating and the lens. (Ichikawa, *Asia Display* '95, Proceedings of the 15th International Display Research Conference, Oct. 16-18, 1995, pages 727-729). It has also been proposed to separate white light into colors by the use of sets of dichroic mirrors individually tuned to the red, green and blue wavelengths. (Hamada, et al., *IDRC '94 Proceedings*, page 422 (1994) and Rho and Kim, *Asia Display '95*, Proceedings of the 15th International Display Research Conference, Oct. 16–18, 1995, pages 83–85). Hamada proposes a single LCD display whereas Rho proposes using a separate LCD for each color.

Other prior art methods to improve projection LCD displays by separation of white light into individual colors are contained in U.S. Pat. No. 5,389,982, 5,196,926 (Lee), JP 6250177 (Hitachi LTD), WO 9422042 (Itoh), JP 6208099 (Fuji Photo Optical), U.S. Pat. No. 5,315,418 (Bruce), JP 6034928 (Seiko Epson), JP 5289047 (Fujitsu LTD), JP 5181107 (Stanley Electric), JP 5173107 (Sharp KK), U.S. Pat. No. 5,357,288 (Pioneer Electronic), U.S. Pat. No. 5,321,448 (Ogowa), JP 3262294 (Fujitsu, LTD), U.S. Pat. No. 5,200,843 (Karasawa), U.S. Pat. No. 4,909,601 (Nakamura), U.S. Pat. No. 4,989,076 (Nagashima), U.S. Pat. No. 4,836,649 (Hughes Aircraft).

The drawback to all of the projection LCD displays which utilize color separation to reduce power inefficiencies associated with color filters is that they are not achieved in flat panel format. Like conventional projection LCD displays they rely on projection optics to provide the largely collimated light required to maintain image resolution in the display. These optical systems require a great deal of depth, even in the advanced "folded-optic" type, and are generally not regarded as flat panel displays or used in applications which require a flat format. Webster (UK Patent Application 2,260,203 A) has proposed an edgelit backlight for a LCD wherein the surface of the backlight is populated with holographic optical elements (HOE) each of which can outcouple light of a particular wavelength regime (or color) and send it towards the appropriate LCD subpixel. However, since the HOE's are only efficient at accomplishing such a color separation when the input light is fairly collimated, and since the light traveling in such an edge lit waveguide is largely uncollimated, the system still requires external projection-type collimating optics to reduce the angular divergence of light traveling within the backlight waveguide. As such the system still lacks a true flat panel format.

Thus it is clear that a need remains for a method and means to provide for a true flat panel format, color LCD display which can achieve good brightness and color without the inefficient power usage of a display which achieves color by the absorptive filtering of white light from a powered backlight or the limited application range of a reflective color LCD which requires high ambient light conditions.

SUMMARY OF THE INVENTION

Accordingly, the present invention provides for a illumination assembly useful as a backlight assembly in a flat panel electronic display or any other application that requires an output of light separated into its color components. In an application as a backlight, the invention combines with a display, such as an LCD, having a modulating means capable of providing an image to a remotely positioned observer, said backlight assembly comprising a light transmitting means for transmitting light and having generally planar first and second surfaces and opposing sides disposed between said first and second surfaces; a reflecting means having at least one input surface optically coupled to said first surface for receiving at least a portion of light from the light transmitting means and for reflecting a portion of light so as to produce a collimated light output at a desired output angle; a diffraction means disposed between said reflecting means and said modulating means for accepting the light output of said reflecting means and separating said light into at least one of red, blue and green light components and; light directing means for spatially directing said light components to the appropriate subpixels of the LCD.

By separating white light into its component colors and directing each component to the appropriate color subpixels of an LCD, a large improvement in power efficiency can be realized over LCD's wherein the color is formed by filtering the white light with color filters.

DESCRIPTION OF THE PREFERRED EMBODIMENTS OF THE INVENTION

The preferred embodiments of this invention will be better understood by those skilled in the art by reference to the above Figures. The preferred embodiments of this invention illustrated in the Figures are neither intended to be exhaustive nor to limit the invention to the precise form disclosed. The Figures are chosen to describe or to best explain the principles of the invention, and its application and practical use to thereby enable others skilled in the art to best utilize the invention.

The key aspect of this invention is to provide for a thin, low profile light assembly, such as a backlight, which can separate white light into red, green and blue components and direct each component of light through the appropriate subpixel of a flat panel LCD display. By low profile, it is meant that when the backlight and LCD are combined, the resulting display can still be considered a flat panel display, that is, the thickness (or depth) of the display will be substantially less than the diagonal measure of the viewing surface (the area where information can be displayed). Preferably, the thickness of the display will be less than one quarter of the diagonal measure of the viewing surface. More preferably, the thickness of the display will be less than one eighth of diagonal measure of the viewing surface. One of the primary features of the backlight is the ability to generate collimated light in a thin, edge lit design appropriate for such a flat panel display.

Figure 1:
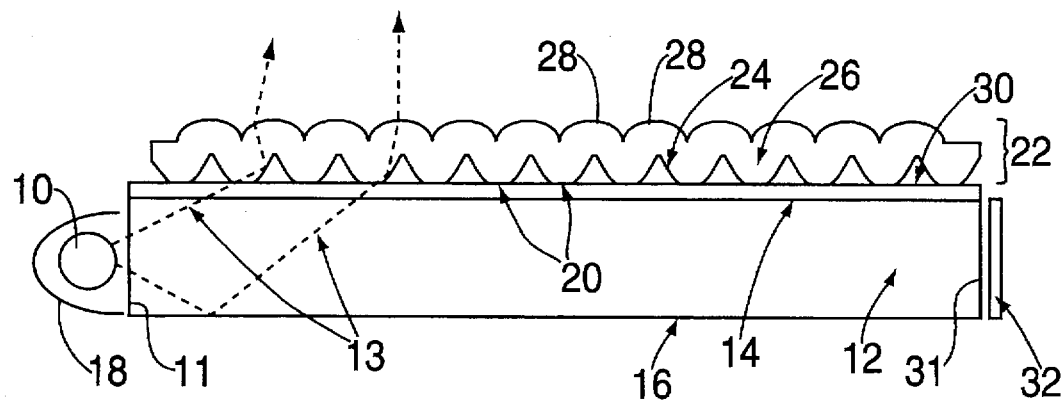
FIG. 1 illustrates an elevation view of a prior art light assembly useful as a backlight for flat panel displays.

FIG. 1 depicts one embodiment of such a thin collimated backlight as described U.S. Pat. No. 5,428,468 (the '468 patent). In this embodiment a white light source 10 such as a fluorescent tube lamp, an incandescent lamp, or a halogen bulb is positioned adjacent to the edge of a clear optical waveguide 12 so that light rays 13 from the light source may be coupled into the waveguide via an input face 11 and propagate throughout its length via total internal reflection at the surfaces of the waveguide. The waveguide may be fashioned from any optically clear material such as glass, plastic or quartz. In general, the waveguide is thin in the direction perpendicular to the plane of the flat panel display to which it will be applied. The waveguide upper 14 and lower 16 surfaces are generally of approximately the same area and dimension as the information display surface of the flat panel display or LCD. Typically a reflector 18 is used around the light source to increase the number of light rays which are coupled into the waveguide. Light rays which encounter one of the input surfaces 20 of the collimation structure 22 are outcoupled from the waveguide and enter the collimation structure. The light rays encounter the reflecting means 26, here, exemplified by angled faces 24 of a prism structure 26 and are reflected towards the LCD or other flat panel display. The light rays are further collimated via refraction by the array of lenses 28. Input surfaces 20 are generally held in optical contact with the optical waveguide by a thin layer of clear adhesive 30. The face 31 of the optical waveguide which is opposite to face 11 may be provided with a reflector 32 so that light reaching that face of the waveguide is reflected back into the waveguide rather than exiting. This serves to increase the efficiency of light utilization of the entire backlight. Alternatively, the reflector 32 may be replaced with a second light source, and such embodiments are further described in the '468 patent.

The reason that a highly collimated backlight is important to the functioning of the current invention is that most mechanisms or optical elements for separation of white light into its component colors will work more efficiently if the input light is collimated, rather than uncollimated, or diffuse. Preferably, the light output of reflecting means 22 is collimated to about ±20°, and more preferably to about ±10°. Such color separating optical elements, well known to those skilled in the art, include diffraction gratings, both surface relief and phase grating types, prisms, holographic optical elements including holographic gratings and grating/lens combinations, diffractive optics and dielectric or dichroic mirrors and optical bandpass elements. By combining one or more of these color separating elements with a thin, low profile collimated backlight, it is possible to provide for the efficient separation of white light into red, green and blue components in a flat panel format. The prior art methods use projection optics to achieve the necessary collimation of the light, and such optics, of necessity, require significantly thicker packages to accommodate the optics. It is not generally possible to provide highly collimated projection light sources that will fit in a flat panel format, thus making them unsuitable for those applications which benefit from a flat panel display design, such as displays for laptop computers.

Figure 2:
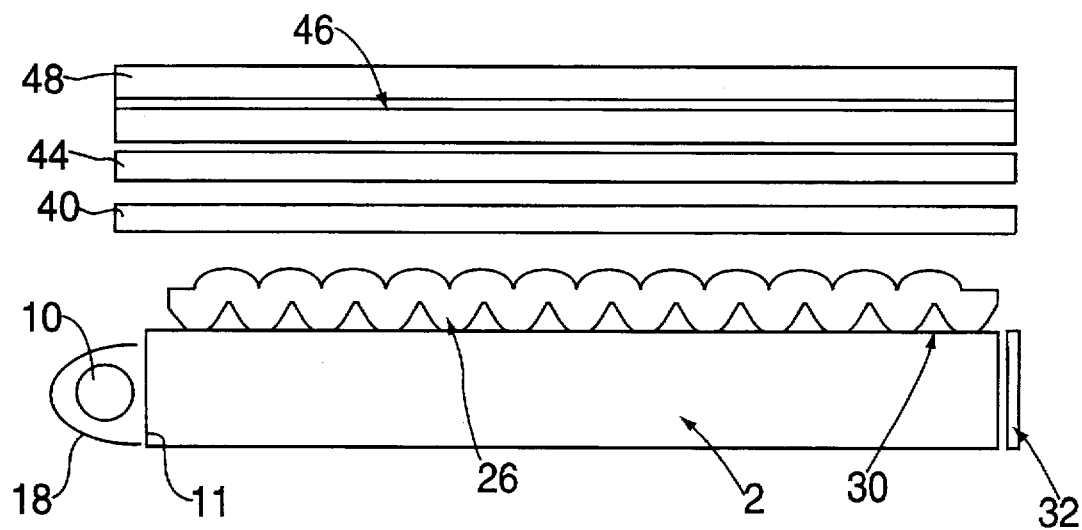
FIG. 2 illustrates the light assembly of FIG. 1 in combination with color separating means and light directing means and a color flat panel display.

FIG. 2 depicts a thin collimated backlight combined with angular color separating means 40, such as a thin flat diffraction grating or a holographic diffraction grating and a light directing means 44 for spatially directing the angularly separated colors of light through the appropriate color subpixel elements 46 of an LCD module 48 to achieve a flat panel format LCD display. In one embodiment, light directing means 44 may be a thin flat array of micro lenses arrayed between the color separating means 40 and the LCD module 48. The micro lenses serve to spatially direct the angularly separated colors of light through the appropriate color subpixels of the pixel array 46 of LCD 48. That is, the lens focuses the blue component through the subpixel element for blue color in the display, and likewise for the red and green colors. It is clear that accurate alignment of the light directing means 44 to the pixel array 46 is a requirement for the useful operation of this invention. Otherwise, the incorrect color of light will reach the subpixel designed to control some other color.

The embodiment shown in FIG. 2 is not the only possible arrangement of these requisite elements. The elements may be in physical contact with each other or may be combined so long as the requisite functions of color separation and light directing means are present. For example, a single two-surface optic wherein one side contains a diffraction grating and the opposite side consists of an array of lenses would be a useful embodiment. Likewise, a single holographic optical element array, wherein both the function of angular color separation and spatial light directing were accomplished in each element of the array would be useful. Such combined functions are often designed by computer calculation and the resulting elements are known in the art as computer generated holograms (CGH).

Figure 3:
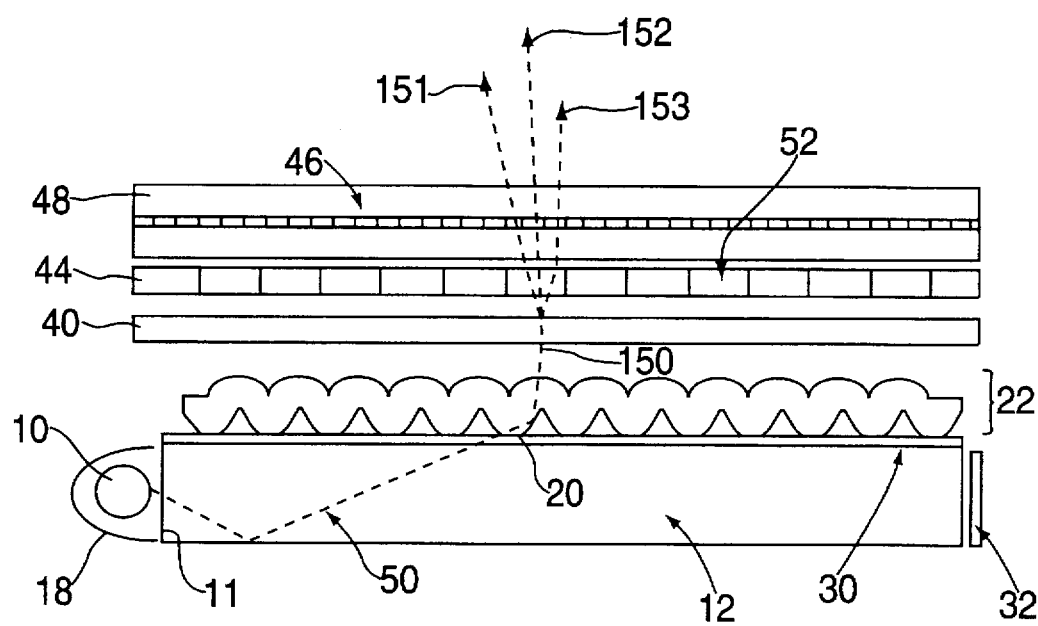
FIG. 3 illustrates an alternate representation of FIG. 2.

FIG. 3 depicts the operation of an embodiment of the invention. White light, represented by a ray 50, from a light source 10 is coupled into the edge 11 of a thin transparent waveguide 12, preferably with a lamp reflector 18 to improve the coupling efficiency. Ray 50 traveling in the waveguide 12 is extracted from the waveguide by coupling out at the contact area 20 between the waveguide and the light collimation structure 22 as described further in the '468 patent. This coupling is usually mediated with an adhesive layer 30 which holds the collimation film optic to the top surface of the clear waveguide. The two surface microoptic collimation structure serves to take the highly angularly divergent white light which is traveling in the waveguide and converts it into a tightly collimated beam, represented by ray 150, which is directed toward the LCD module 48. This conversion of the angular property of the white light is accomplished in a thin, low profile format which typically adds only one to two millimeters of thickness to the edge lit waveguide which is commonly used in the art to supply backlighting to LCD modules. This is distinctly different from using bulky projection optics to accomplish the angular collimation of light from the light source. The collimated white light 150 is directed from the collimation structure towards the color separation means 40 such as a diffraction grating or holographic element, and the white light 150 is angularly separated into its component colors, represented by the separate beams of red 151, green 152 and blue 153 light. The angularly separated colors of light are then spatially separated through a light directing means 44 such as an array of micro lenses 52 which direct each color through the appropriate red, green and blue subpixels of pixel array 46 of the LCD. Such micro lenses may include, but not be limited by, an array of plano convex lenses, either spherical or aspheric in surface shape, or may be an array of graded refractive index (GRIN) lenses.

If the white light source 10 is a continuum source then the color separating means will produce a spatially separated color continuum or spectrum of light. More preferred is a white light source which is composed of just the red, blue and green wavelengths corresponding to the desired red, blue and green components which the LCD will serve to modulate. This is typically provided by coating the inside of a fluorescent light tube with a mixture of three phosphor materials, one each for red, green and blue regions of the color spectrum. Such light sources containing so-called tri-band phosphors are well known in the art. When light from such a light source is passed through a light separating means, such as a diffraction grating, the three colors will be angularly separated, but no intermediate colors such as yellow or orange will be present to degrade the spectral purity of the three colors of the display. Similarly, the three desired colors may be provided by coupling the output light of three types of light emitting diodes (LEDs), one red, one green and one blue, to the clear optical waveguide of the backlight. In cases where the white light source is a continuum, the unwanted colors of the visible spectrum may be removed by arranging the optics so that those unwanted colors fall onto the black matrix surrounding the subpixels of the LCD and are absorbed. Alternatively, in all cases, the LCD may be operated with the color filters in place in front of the subpixels of the display. Such an arrangement, while not fully optimal from a power utilization standpoint, will still operate with an improved power efficiency over a standard backlit LCD because the light separating and directing means will still direct the majority of the proper color of light to the proper color filter where the resulting loss will be only the transmission loss of the filter for its own color, typically 20 to 40%. Unwanted colors of light will be absorbed by the filters and removed from the image which is transmitted to the viewer. In some cases this latter embodiment may be preferred, because it demonstrates improved efficiency over a conventional LCD, but does not require the color separating and directing means to perform perfectly in order to achieve good color purity in the display image. This may be desirable to avoid the manufacturing requirement of providing well separated and directed color components of sufficient spectral purity that they require no color filters.

While the thin collimated light sources described in the '468 patent are preferred for use with color separation means, such as gratings and holographic optical elements, compared to the diffuse light sources typically employed in LCD's, these collimated light sources are typically intended to provide for highly collimated light rays traveling perpendicular to the plane of the LCD or other flat panel display. This is not the most preferred direction for the light rays of the present invention. More preferred are flat collimated light sources wherein the majority of light rays are directed at an angle from the normal of the plane of the LCD as described in U.S. Pat. No. 5,555,329 assigned to the same assignee as the present invention. This allows for color separation means such as surface or volume gratings and holographic elements to operate at higher efficiencies. Preferred are thin, flat collimated backlights where the light which exits the collimation means is directed onto the color separation means at an angle from about 10° to about 80° to the normal of the plane of the color separation means or to the normal of the plane of the flat panel display. More preferred are angles from about 20° to about 40° to the normal of the plane of the display.

Figure 4:
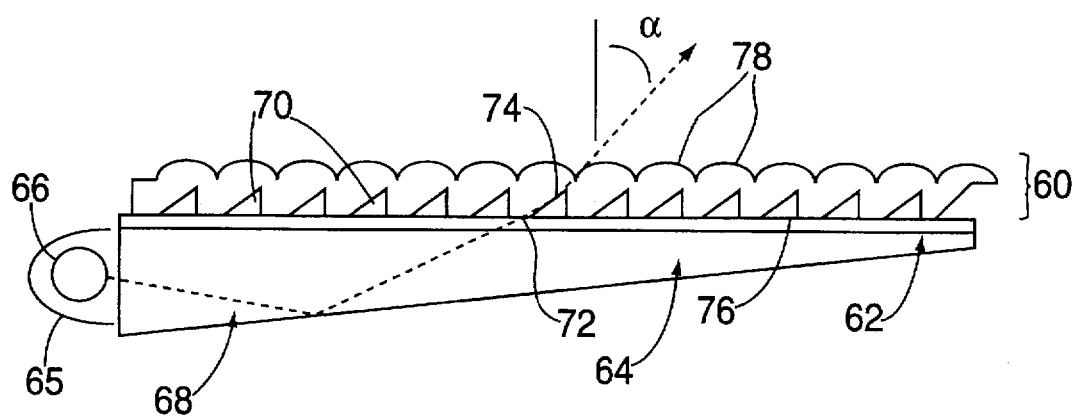
FIG. 4 illustrates an alternate embodiment of a light assembly useful as a backlight.

An embodiment of a thin collimated light source wherein the output rays are directed at such an angle is depicted in FIG. 4. In this embodiment the collimating light extracting means 60 is optically coupled, as by an optically clear adhesive 62, to the top surface of a transparent optical wedge waveguide 64. Light from a white light source 66, represented by light ray 68 is edge coupled into the transparent optical waveguide preferably with the use of a lamp reflector 65 to increase the coupling efficiency. Light ray 68 traveling within the optical waveguide enters light removal elements 70 at the points of optical contact 72 and are reflected from the first angled surface 74 by total internal reflection where the angle of surface 74 is chosen to direct the light at an angle $\alpha$ to the normal of the plane of the top surface 76 of waveguide 64. Light ray 68 is then further collimated via refraction by the lens array 78 which constitutes the upper surface of the light collimation means 60. The angle of the light ray as it exits lens array 78 is indicated as angle $\alpha$.

Figure 5:
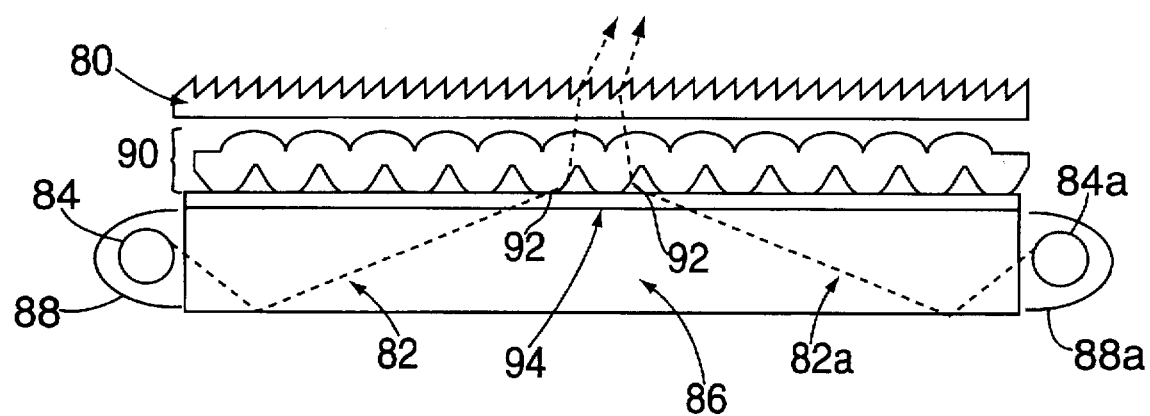
FIG. 5 illustrates a light assembly useful as a backlight in combination with alternate light directing means.

In still a further alternate embodiment, the thin collimated backlight disclosed in the '468 patent may be utilized with an additional optical turning element such as an array of grooves that serve to direct the light to some angle away from the normal to the plane of the LCD. Such an additional optical turning element 80 is shown in FIG. 5. In this embodiment light rays, represented as light ray 82 and 82a, produced by a white light sources 84 and 84a are coupled into a clear optical waveguide 86 with lamp reflectors 88 and 88a and then into the collimation structure 90 by the areas of optical contact areas 92 with the clear adhesive layer 94. Rays 82 and 82a exit the collimation structure 90 at an angle near to the normal of the plane of the waveguide 86 and are directed by the optical turning element 80 to a more preferred angle of between about 10° to about 80° from the normal to the plane of the surface of waveguide 86. FIG. 5 illustrates the embodiment wherein two white light sources and two lamp reflectors are edge coupled into the clear optical waveguide, but as will be recognized by those skilled in the art, the embodiment shown in FIG. 1 in combination with optical turning element 80 is equally applicable.

EXAMPLE 1

The emission spectrum of a tri-band phosphor fluorescent tube was determined to be blue light in the wavelength region 427–443 nm, green light in the region 532–557 nm and red light in the region 603–618 nm. For the purposes of calculation the three wavelengths were chosen to be blue at 435 nm, green at 545 nm and red at 610 nm. The grating equation $\alpha_{out}=180/\pi$ arcsin $(m\lambda/d+\sin(\pi\alpha_{in}/180))$ where $\alpha_{out}$=angle out, $\alpha_{in}$=angle in, $\lambda$=wavelength, m=grating order and d=grating spacing was solved for these three wavelengths of light assuming a holographic grating with m=1 and a grating period of 1,500 lines per mm. The angular separation of the three colors of light after passing through such a grating was calculated to be 14.1° between green and blue and 11.6° between green and red.

EXAMPLE 2

A computer light ray tracing program (ASAP, Breault Research Co.) was used to model whether an array of graded refractive index (GRIN) lenses could be used to spatially separate the three colors of light using the angular characteristics for each color calculated in example 1. For the purposes of the calculation the following values were used. The GRIN lens array was an array of lenses of square cross section in the plane perpendicular to the propagation axis of the light. Each lens in the array had a cross sectional edge dimension of 50 microns and a length in the propagation axis of 195 microns. The index profile of each grin lens was quadratic with the highest value $n_0$ at the center axis of each lens. From the center of the lens to the edge of the lens the index followed the relationship, $n(x)=n_0[1-(a/2)x^2]$, where $n_0=1.55$, a=0.008 and x is the distance, in microns, from the center of the lens to position x within the lens. Using these values, the refractive index profile from the core to the edge of the lens decreases from a value of 1.55 to about a value of 1.52. The incoming light was assumed to have an angular spread of 12° between green and red and between green and blue, with green being the center color in the three color spectrum. This value is reasonable for the calculation based on the result of Example 1. In addition, the angular spread of each color was assumed to be ±6°, since the collimation from the flat collimating backlight of the invention is not perfect. Using these input conditions the computer program calculated the spatial separation of the three colors at the output face of the GRIN lens array. At the output face the bundle of light rays representing each of the three colors was focused to a diameter of approximately 17 micron by the focusing action of the GRIN. However, each bundle of rays representing a separate color was spatially resolved from the other two, with the green bundle in the center of the lens, and the red and blue bundles clustered to opposite sides of the lens. That is, because of the divergent angular characteristic imparted to each color by the interaction with a holographic grating as in Example 1, the light directing means, in this case an array of GRIN microlenses, was capable of spatially separating each of the colors from the other two. Such a condition is required in order that each color may be individually directed to fall on the appropriate color subpixel of a flat panel display such as an LCD.

What is claimed is:

1. A backlight assembly for use in a flat panel electronic display, said display having a modulating means capable of providing an image to a remotely positioned observer, said backlight assembly comprising means for transmitting light and having a generally planar first surface; a reflecting means having at least one input surface optically coupled to said first surface for receiving a portion of light from said light transmitting means and for reflecting a portion of light so as to produce a collimated light output at a desired output angle; a diffraction means disposed between said reflecting means and said modulating means for accepting said collimated light and separating said light into at least one of red, blue and green light components and; light directing means for spatially directing said light components.

2. The backlight assembly of claim 1 wherein said light directing means spatially directs said light components to corresponding subpixels of said light modulating means.

3. The backlight assembly of claim 1 wherein said reflecting means comprises an array of microprisms wherein each microprism comprises:

(a) an input surface optically coupled to said light transmitting means for receiving a portion of light transmitting through said light transmitting means;

(b) a sidewall having an edge defined by said light input surface and further positioned for (i) effecting total internal reflection of a portion of light received by said light input surface; and (ii) directing said reflected light as a substantially collimated output from said microprism.

4. The backlight assembly of claim 3 wherein said reflecting means further comprises a convex output surface.

5. The backlight assembly of claim 1 wherein said diffraction means being selected from the group consisting of a surface relief hologram, a volume hologram, a grooved diffraction grating, an array of prisms, and a computer generated holographic optical element.

6. The backlight assembly of claim 1 wherein said light directing means being selected from the group consisting of an array of plano convex micro lenses, an array of biconvex microlenses, an array of graded refractive index lenses or a computer generated holographic optical element.

7. An illumination assembly comprising light transmitting means; a reflecting means having at least one input surface optically coupled to said first surface for receiving a portion of light from said light transmitting means and for reflecting a portion of light so as to produce a collimated light output at a desired output angle; a diffraction means for accepting said collimated light and separating said light into at least one of red, blue and green light components and; light directing means for spatially directing said light components.

8. A illumination assembly comprising:

(a) a light transmitting means having means for accepting light;

(b) an array of microprisms wherein at least one microprism comprises:

(i) an input surface optically coupled to said light transmitting means for receiving a portion of light transmitting through said light transmitting means;

(ii) a sidewall having an edge defined by said light input surface and positioned for effecting total internal reflection of a portion of light received by said light input surface;

(c) diffracting means positioned to accept light reflecting off said sidewall and for separating light into at least a red, blue or green component; and (d) light directing means for spatially directing at least one of said light components.

9. The illumination assembly of claim 8 wherein said microprism further comprises a convex output surface.

10. An illumination assembly comprising:

(a) a light transmitting means;

(b) an array of microprisms wherein at least one microprism comprises:

(i) a light input surface optically coupled to said light transmitting means for receiving a portion of light transmitting through said light transmitting means;

(ii) a first pair of sidewalls each having a common edge with said input surface and at least one of said sidewalls is positioned for effecting total internal reflection of a portion of light received by said light input surface;

(iii) a second pair of sidewalls each having a common edge with said input surface and at least one of said sidewalls is positioned for effecting total internal reflection of a portion of light received by said light input surface;

(c) diffracting means positioned to accept light reflecting off said sidewall for separating light into at least a red, blue or green component; and (d) light directing means for spatially directing at least one of said light components.

11. The illumination assembly of claim 10 wherein said microprism further comprises a convex output surface.

* * * * *